US008769164B2

(12) United States Patent
Alferness et al.

(10) Patent No.: US 8,769,164 B2
(45) Date of Patent: Jul. 1, 2014

(54) METHODS AND APPARATUS FOR ALLOCATING BANDWIDTH FOR A NETWORK PROCESSOR

(75) Inventors: Merwin H. Alferness, Rochester, MN (US); William J. Goetzinger, Rochester, MN (US); Kent H. Haselhorst, Byron, MN (US); Lonny Lambrecht, Byron, MN (US); Joshua W. Rensch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1757 days.

(21) Appl. No.: 10/667,029

(22) Filed: Sep. 18, 2003

(65) Prior Publication Data

US 2005/0066144 A1    Mar. 24, 2005

(51) Int. Cl.
*G06F 13/00* (2006.01)
*G06F 3/00* (2006.01)

(52) U.S. Cl.
USPC ........ 710/29; 710/8; 710/15; 710/16; 710/17; 710/18; 710/36; 710/60; 710/104; 711/150; 711/170; 370/231; 370/235; 370/395.21; 370/395.41; 370/468

(58) Field of Classification Search
USPC ......... 710/5, 6, 8, 15–18, 29, 36, 58, 60, 104; 711/150, 170; 370/231, 235, 325, 370/395.21, 395.41, 398, 437, 461
See application file for complete search history.

(56) References Cited

U.S. PATENT DOCUMENTS

| | | | |
|---|---|---|---|
| 5,515,376 A * | 5/1996 | Murthy et al. | 370/402 |
| 5,838,681 A * | 11/1998 | Bonomi et al. | 370/395.41 |
| 6,052,738 A * | 4/2000 | Muller et al. | 709/250 |
| 6,067,301 A * | 5/2000 | Aatresh | 370/418 |
| 6,098,123 A * | 8/2000 | Olnowich | 710/41 |
| 6,144,638 A * | 11/2000 | Obenhuber et al. | 370/231 |
| 6,145,010 A * | 11/2000 | Hiscock et al. | 709/238 |
| 6,249,528 B1 * | 6/2001 | Kothary | 370/466 |
| 6,424,657 B1 * | 7/2002 | Voit et al. | 370/412 |
| 6,424,658 B1 * | 7/2002 | Mathur | 370/429 |
| 6,442,137 B1 * | 8/2002 | Yu et al. | 370/232 |
| 6,442,138 B1 * | 8/2002 | Yin et al. | 370/232 |
| 6,501,734 B1 * | 12/2002 | Yu et al. | 370/236 |
| 6,549,515 B1 * | 4/2003 | Sourani et al. | 370/232 |
| 6,560,231 B1 * | 5/2003 | Kawakami et al. | 370/395.43 |
| 6,744,776 B1 * | 6/2004 | Kalkunte et al. | 370/412 |
| 7,031,305 B1 * | 4/2006 | Yu et al. | 370/389 |
| 2003/0007211 A1 * | 1/2003 | Gummalla et al. | 359/136 |
| 2004/0017781 A1 * | 1/2004 | Alferness et al. | 370/252 |

* cited by examiner

*Primary Examiner* — Tanh Nguyen
(74) *Attorney, Agent, or Firm* — Dugan and Dugan, PC

(57) ABSTRACT

In a first aspect, a first method is provided for self-adjusting allocation of memory bandwidth in a network processor system. The first method includes the steps of (1) determining an amount of memory bandwidth of a network processor used by each of a plurality of data types; and (2) dynamically adjusting the amount of memory bandwidth allocated to at least one of the plurality of data types based on the determination. Numerous other aspects are provided.

23 Claims, 4 Drawing Sheets

|          | 1     | 2     | 3     | 4     | 5     | 6     | 7     | 8     |
|----------|-------|-------|-------|-------|-------|-------|-------|-------|
| G-Active | 0     | 1     | 0     | 1     | 2     | 0     | 1     | 1     |
| F-Active | 0     | 5     | 8     | 2     | 1     | 14    | 3     | 4     |
| G-Rate   | 0     | 10    | 0     | 10    | 20    | 0     | 10    | 10    |
| F-Rate   | 0     | 5     | 8     | 2     | 1     | 14    | 3     | 4     |
| E-Rate   | 0     | 15    | 8     | 12    | 21    | 14    | 13    | 14    |
| G-Avail  | True  | False | True  | True  | False | True  | True  | True  |
| F-Avail  | True  | True  | True  | True  | True  | False | True  | True  |
| FG-Avail | True  | False | False | False | True  | False | True  | False |
| G-Gate   | False | True  | False | False | False | True  | False | False |
| F-Gate   | False | False | False | False | False | False | False | True  |

FIG. 4

METHODS AND APPARATUS FOR ALLOCATING BANDWIDTH FOR A NETWORK PROCESSOR

FIELD OF THE INVENTION

The present invention relates generally to network processors, and more particularly to methods and apparatus for allocating bandwidth.

BACKGROUND

Network processors often are employed in a network device to handle transmission of data into and out of the network device. The network processor receives data via one or more input ports and may store the received data in a system memory. The network processor may include one or more output ports that are each coupled to a network connection. Data received by the network processor and stored in the system memory may be retrieved from the system memory and transmitted from the network processor via one of the output ports and network connections. At any given time, the system memory receives commands to retrieve data to be transmitted from one or more output ports of the network processor.

A problem arises when data is to be transmitted from one or more output ports of the network processor at a high speed. Because the system memory is of a limited bandwidth, the network processor may not be able to retrieve information from the system memory fast enough to accurately transmit data from each of the output ports. More specifically, the system memory bandwidth may cause a delay in the transmission of data from a first output port while it is retrieving data to be transmitted from a second output, and vice versa. For an ATM (Asynchronous Transfer Mode) data type, a delay in the transmission of data from an output port does not corrupt the data. However, for Ethernet data types, a delay in the transmission of data from an output port corrupts the data; and the receiving end (e.g., a network device coupled to the output port via the network connection) will the detect data corruption and request retransmission of the data. Therefore, the network processor must retransmit the data. If the first port causes delays in the transmission of data from the second port and the second port causes delays in the transmission of data from the first port, the network processor must retransmit data from both ports. However, the same problem may occur during the retransmission of data. Consequently, the network processor may continuously attempt to retransmit the same data, causing no data to be transmitted from the network processor.

Although increasing the system memory bandwidth may avoid the above problem, it is an expensive solution. Alternatively, the above problem may be avoided by only transmitting data of the ATM data type. However, network processors may need to transmit data of a plurality of data types. Therefore, improved methods and apparatus of allocating memory bandwidth in a network processor are needed.

SUMMARY OF THE INVENTION

In a first aspect of the invention, a method is provided for self-adjusting allocation of memory bandwidth in a network processor system. The first method includes the steps of (1) determining an amount of memory bandwidth of a network processor used by each of a plurality of data types; and (2) dynamically adjusting the amount of memory bandwidth allocated to one of the plurality of data types based on the determination.

In a second aspect of the invention, an apparatus is provided that includes port activation logic adapted to couple to a memory of a network processor. The port activation logic is adapted to (1) determine an amount of memory bandwidth of the network processor used by each of a plurality of data types; and (2) dynamically adjust the amount of memory bandwidth allocated to at least one of the plurality of data types based on the determination. Numerous other aspects are provided, as are systems and methods in accordance with these and other aspects of the invention.

Other features and aspects of the present invention will become more fully apparent from the following detailed description, the appended claims and the accompanying drawings.

BRIEF DESCRIPTION OF THE FIGURES

FIG. 4 illustrates a table of values for variables used in the present invention for different exemplary network processor systems.

DETAILED DESCRIPTION

As mentioned above, because the memory of a network processor is of a limited bandwidth, a network processor may not be able to retrieve information from the memory fast enough to accurately transmit data from each of the output ports of the network processor. More specifically, the memory bandwidth may cause a delay in the transmission of data of certain data types from a first output port while it is retrieving data to be transmitted from a second output port. Because a delay (e.g., an underrun) in the transmission of data of a certain data type (e.g., Fast Ethernet or Gigabit Ethernet, etc.) from the output port corrupts the data, improved methods and apparatus for allocating memory bandwidth to avoid such delays or underruns are desired. Methods and apparatus for allocating memory bandwidth to avoid delays or underruns while transmitting data of one or more data types are described below with reference to FIG. 1-3.

Figure 1:
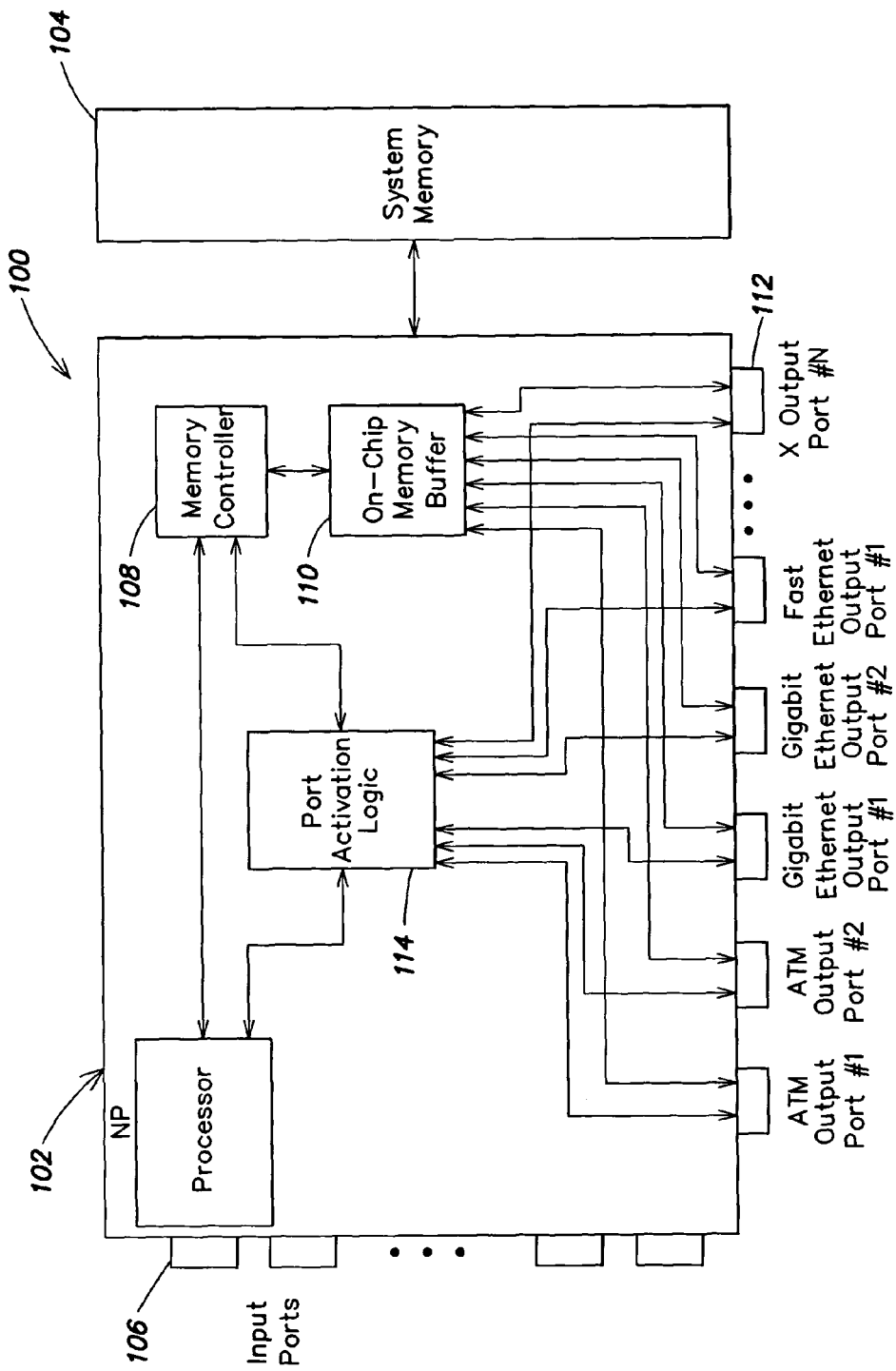
FIG. 1 is a diagram of an exemplary network processor system in which the present invention may be implemented.

FIG. 1 is a diagram of an exemplary network processor system 100 in which the present methods and apparatus may be implemented. The network processor system 100 includes a network processor 102 coupled to a memory 104. The network processor 102 may receive data via one or more input ports 106. The data may be of one or more data types, such as ATM, Fast Ethernet, and/or Gigabit Ethernet. The network processor 102 may store the received data in the memory 104 (e.g., a memory of limited bandwidth). The network processor 102 may retrieve the data of one or more data types from the memory 104 and transmit the retrieved data.

The network processor 102 may include a memory controller 108 coupled to the memory 104 for enabling the network processor 102 to communicate with (e.g., read from and/or write to) the memory 104. The network processor 102 may include an on-chip memory buffer 110 coupled to the memory controller 108. The on-chip memory buffer 110 may be used for locally storing data received by the network processor 102 and/or data to be transmitted by the network processor 102. The network processor 102 may include one or more output ports 112 coupled to the memory 104 via the memory controller 108 and the on-chip memory buffer 110, for example, for transmitting the data, retrieved from the memory 104 from the network processor 102. The one or more output ports 112 may each be coupled to a network connection (not shown), for enabling the network processor 102 to communicate with another network device (not shown) also coupled to the network connection. The one or more output ports 112 may be coupled to port activation logic 114 included in the network processor 102. For a given time, the port activation logic 114 may determine whether enough memory bandwidth is available to initiate transmission of data of a certain data type by activating a new port.

The port activation logic 114 may be hardware, software, or a combination thereof. For example, in one implementation, the logic may be implemented in an application specific integrated circuit (ASIC), a programmable logic circuit, or similar standard logic circuit.

Figure 2:
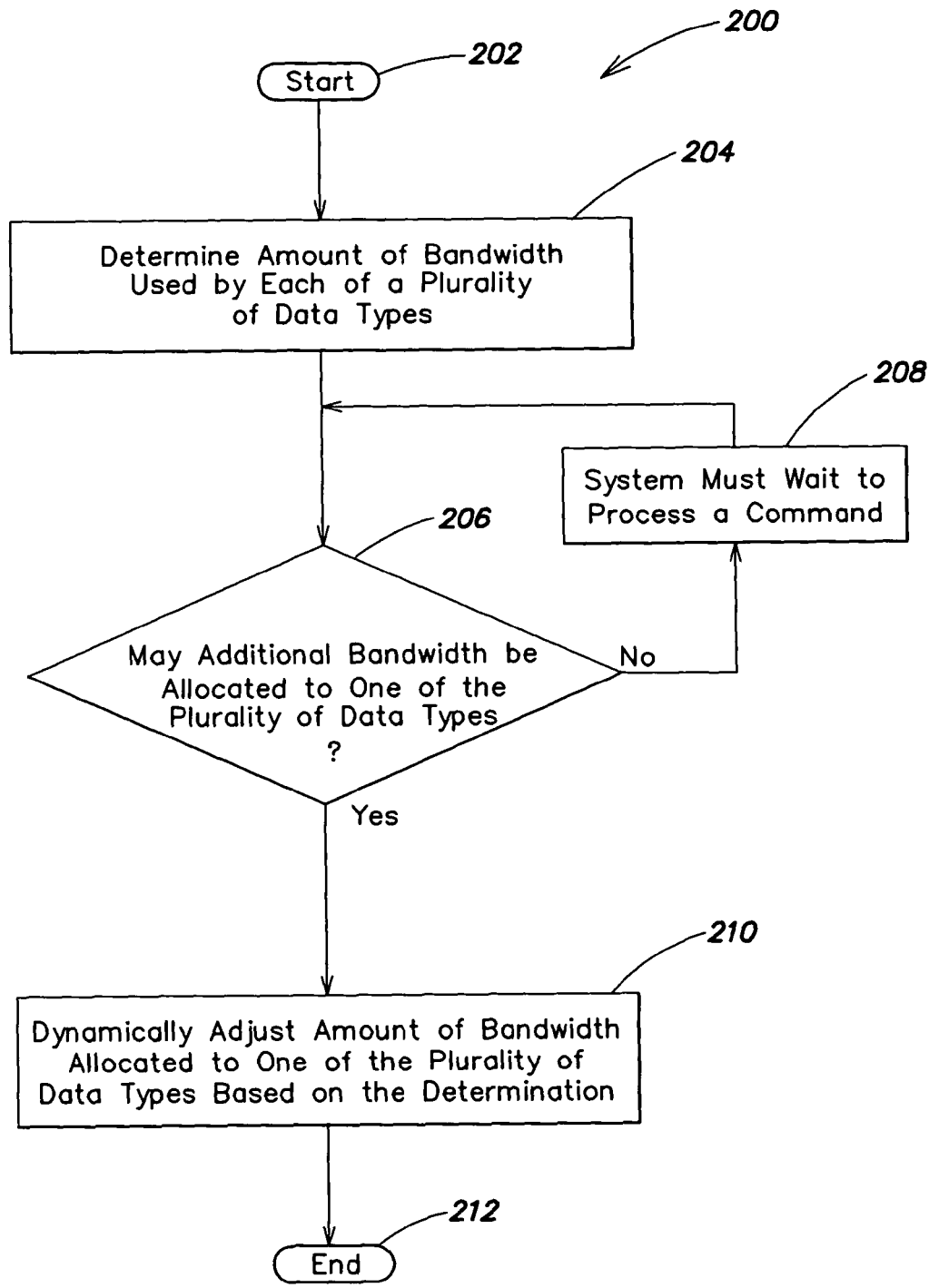
FIG. 2 illustrates an exemplary method of self-adjusting the allocation of memory bandwidth in the network processor system of FIG. 1.

The operation of the network processor system 100 is now described with reference to FIG. 1, and with reference to FIG. 2 which illustrates an exemplary method of self-adjusting the allocation of memory bandwidth in a network processor system. With reference to FIG. 2, in step 202, the method 200 begins. In step 204, the amount of memory bandwidth used by each of a plurality of data types is determined. Step 204 is performed in response to a command received by the memory to transmit data of a certain data type from the network processor using a new port.

ATM data is guaranteed memory bandwidth according to a subscription agreement between a user and a bandwidth provider. Therefore, even if the ATM data is not fully using the agreed upon memory bandwidth, for the above determination, the total amount of memory bandwidth used for transmitting ATM data from one or more output ports 112 of the network processor 102 will be the agreed upon memory bandwidth.

The total amount of memory bandwidth currently used for transmitting Fast Ethernet data from one or more output ports 112 of the network processor 102 is also determined. More specifically, the total amount of memory bandwidth used for retrieving Fast Ethernet data from the memory 104 to the on-chip memory buffer 110 is calculated. From the on-chip memory buffer 110, the Fast Ethernet data will be retrieved and transmitted from one or more output ports.

A determination is made for the Gigabit Ethernet data type in a manner similar to that of the Fast Ethernet data type described above. In contrast to the ATM data type, the total amount of memory bandwidth currently used for transmitting Fast Ethernet data (or alternatively Gigabit Ethernet data) only includes memory bandwidth actively being used to transmit Fast Ethernet data (or alternatively Gigabit Ethernet data).

In step 206, it is determined whether additional memory bandwidth may be allocated to one of the plurality of data types. More specifically, it is determined whether additional memory bandwidth may be allocated to the Fast Ethernet data type, if the command received by the memory to transmit data of a certain data type from the network processor using a new port was a command to transmit Fast Ethernet data. Alternatively, it is determined whether additional memory bandwidth may be allocated to the Gigabit Ethernet data type, if the command received by the memory was a command to transmit Gigabit Ethernet data. The additional memory bandwidth refers to an amount of memory bandwidth that when used to transmit the data of one of the plurality of data types, will substantially guarantee transmission of that data without the delays or underruns described above. For the remaining description, it is assumed that one of the plurality of data types refers to Fast Ethernet data. However, it should be understood that the method shown in FIG. 2 may be performed on Gigabit Ethernet data in a similar manner.

If it is determined in step 206 that additional memory bandwidth may not currently be allocated to the Fast Ethernet data type, step 208 is performed. In step 208, the memory waits to execute the command to transmit Fast Ethernet data received by the memory. Thereafter, step 206 is performed.

If it is determined in step 206 that additional memory bandwidth may be allocated to the Fast Ethernet data type, step 210 is performed. In step 210, the amount of memory bandwidth allocated to one of the plurality of data types is dynamically adjusted based on the determination. More specifically, additional memory bandwidth for transmitting Fast Ethernet data from the network processor using a new output port will be allocated to the Fast Ethernet data type. For the reasons mentioned above, this transmission will avoid the delays and/or underruns described above. In step 212, the method 200 of FIG. 2 ends.

As mentioned above, the ATM data is guaranteed memory bandwidth. Therefore, steps 206, 208, and 210 do not need to be performed on ATM data.

Figure 3:
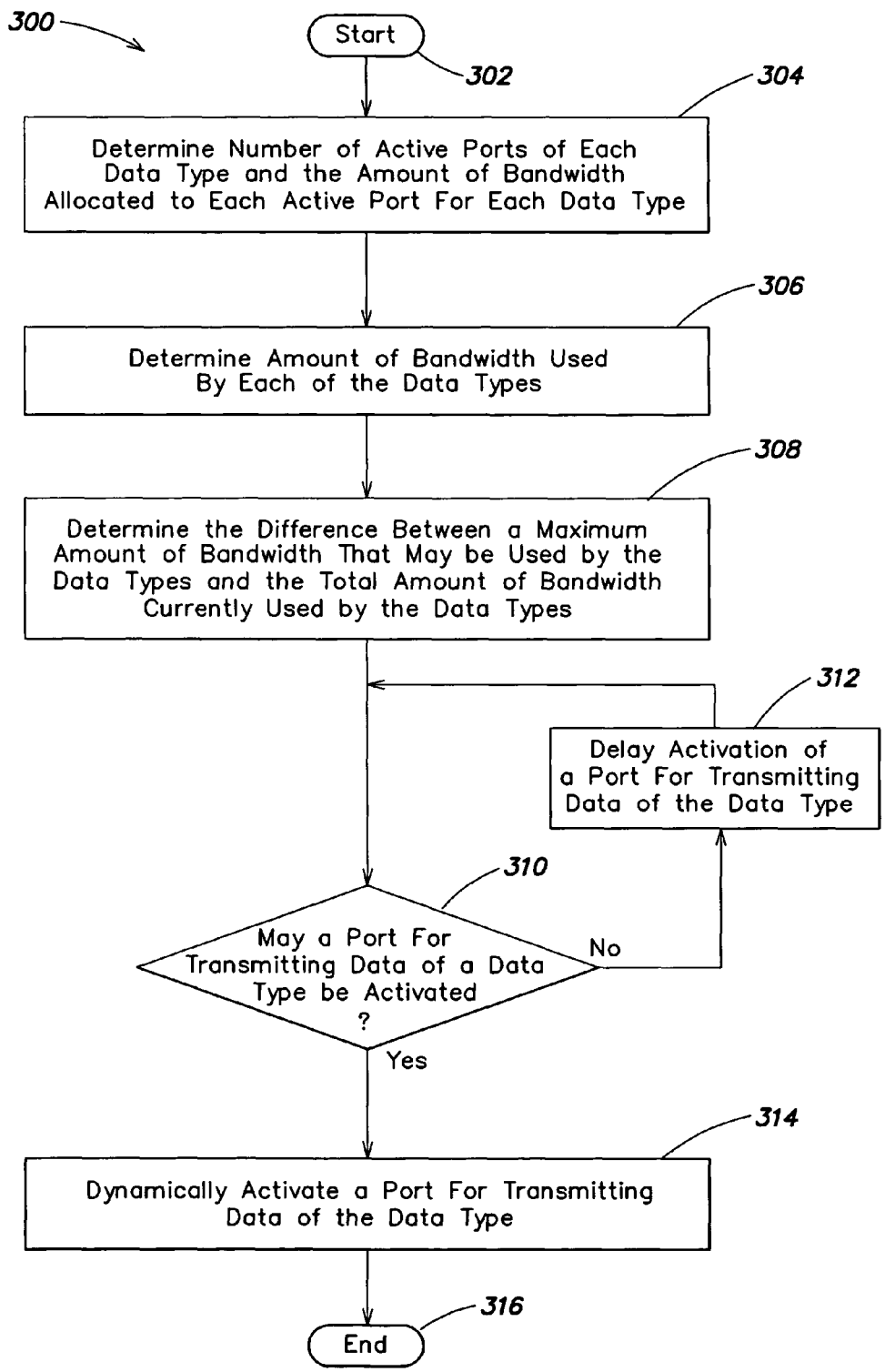
FIG. 3 illustrates an exemplary method of self-adjusting the allocation of memory bandwidth in the network processor system of FIG. 1 by activating a port.

The operation of the network processor system 100 is now described with reference to FIG. 1, and with reference to FIG. 3 which illustrates an exemplary method of self-adjusting the allocation of memory bandwidth in the network processor system by activating a port. With reference to FIG. 3, in step 302, the method 300 begins.

In step 304, the number of active ports used for transmitting data of each of the plurality of data types and the amount of memory bandwidth allocated to each active port for each of the plurality of data types is determined. For example, the network processor system 100 may receive and transmit data of the ATM, Fast Ethernet, and Gigabit Ethernet data types. A bandwidth factor may be assigned to one or more of the plurality of data types using the port activation logic 114. The bandwidth factor represents a number of units of memory bandwidth allocated to an output port. In one embodiment, the bandwidth factor represents one or more 100 Mbps portions of the memory bandwidth allocated to each output port 112 of the network processor 102. For the Fast Ethernet and Gigabit Ethernet data types, an output port refers to output ports that are active (e.g., output ports currently transmitting data from the network processor 102). In contrast, for the ATM data type, an output port refers to output ports that are enabled and/or active. Enabled output ports are output ports allocated to transmit data of a certain type but which are not currently transmitting data (e.g., not active).

A user may assign a bandwidth factor to one or more data types. The Fast Ethernet data type may be assigned a bandwidth factor (F-Factor) of 1. Therefore, one 100 Mbps portion (1×100) of the memory bandwidth is allocated to each active output port 112 of the network processor system 100 used for transmitting Fast Ethernet data. Similarly, a Gigabit Ethernet bandwidth factor (G-factor) may be assigned (e.g., by a user) to be 10. Therefore, ten 100 Mbps portions (10×100) of memory bandwidth is allocated to each active output port 112 used for transmitting Gigabit Ethernet data.

The port activation logic 114 may include a register for storing a value for an ATM bandwidth factor (A-factor). The A-factor represents the number of 100 Mbps portions of the memory bandwidth allocated to each active output port 112 of the network processor used for transmitting ATM data. An active ATM port includes an ATM port that is enabled and/or active. Because the register is configurable, the A-factor may be changed (e.g., by a user) based on the amount of ATM data received by and transmitted from the network processor system 100. Other types of storage devices may be used to store the ATM bandwidth factor. The network processor system 100 may determine the amount of memory bandwidth allocated to each active Fast Ethernet, Gigabit Ethernet, and/or each enabled and/or active ATM port by looking up the value of the F-factor, G-factor and/or the A-factor in the port activation logic 114.

In step 306, the port activation logic 114 of the network processor system 100 determines the amount of memory bandwidth used by each of the plurality of data types. In one embodiment, the network processor system may determine the amount of memory bandwidth used by each of Fast Ethernet data, Gigabit Ethernet data, and ATM data. The amount of memory bandwidth used by ATM data (A-rate) equals the number of enabled and/or active ATM ports (A-active) multiplied by the amount of memory bandwidth used by each enabled and/or active ATM port (A-factor). Therefore, A-rate=A-active*A-factor. Similarly, the amount of memory bandwidth used by Fast Ethernet data (F-rate) equals the number of active Fast Ethernet ports (F-active) multiplied by the amount of memory bandwidth used by each active Fast Ethernet ports (F-factor). Therefore, F-rate=F-active*F-factor. Likewise, G-rate=G-active*G-factor.

Because both Fast Ethernet and Gigabit Ethernet data are types of Ethernet data, the total amount of memory bandwidth used by Ethernet data (E-rate) equals the sum of the amount of memory bandwidth used by Fast Ethernet data (F-rate) and Gigabit Ethernet data (G-rate). Therefore, E-rate=F-rate+G-rate.

In step 308, the difference between a maximum amount of memory bandwidth (e.g., system memory bandwidth) of the network processor system that may be used by the plurality of the data types and the total amount of memory bandwidth of the network processor currently used by the plurality of data types is determined. The maximum amount of memory bandwidth (C-limit) of the network processor system 100 that may be used by the plurality of data types represents a portion of the memory bandwidth allocated to store data received by and/or to be transmitted from the network processor system 100. The port activation logic 114 may include a register for storing a value for the C-limit. The register may be configurable, and therefore, the C-limit may be changed (e.g., by a user) based on a change in the network processor system 100 configuration. Other types of storage devices may be used to store the value for C-limit. For example, if the network processor system 100 needs to receive and transmit a greater amount of data, a user may increase the maximum amount of memory bandwidth that may be used for receiving and transmitting data by increasing the C-limit. Therefore, in step 308, C-limit−A-rate−E-rate may be determined.

Because ATM data is guaranteed memory bandwidth based on a subscription agreement between a user and a bandwidth provider, ATM data is allocated memory bandwidth prior to the Ethernet data types (e.g., Fast Ethernet data and Gigabit Ethernet data). Therefore, a maximum amount of memory bandwidth of the network processor system 100 that may be used for transmitting Ethernet data (E-limit) may be the difference between the maximum amount of memory bandwidth (C-limit) that may be used by the plurality of the data types (C-limit) and the amount of memory bandwidth used by ATM data (A-rate). More specifically, E-limit=C-limit−A-rate.

The port activation logic 114 may be designed to determine whether enough memory bandwidth is currently available to transmit Gigabit Ethernet data using a new Gigabit Ethernet port by comparing the value of (C-limit−A-rate−E-rate) with the minimum amount of memory bandwidth that must be allocated to each new active output port 112 used to transmit Gigabit Ethernet data (e.g., G-factor). If G-factor is less than or equal to the difference between the maximum amount of memory bandwidth currently used by the plurality of data types (e.g., C-limit−A-rate−E-rate), a value indicating enough memory bandwidth is currently available for activating a new Gigabit Ethernet output port (G-avail) is set to TRUE.

More specifically, the test performed by the port activation logic 114 is G-avail=G-factor≤(C-limit−A-rate−E-rate). Alternatively, by substituting E-limit for C-limit−A-rate in the above equation and rearranging the variables, the above test performed by the port activation logic 114 may be expressed as G-avail=E-rate≤(E-limit−G-factor).

Similarly, the port activation logic 114 may be designed for determining whether enough memory bandwidth is currently available to transmit Fast Ethernet data using a new Fast Ethernet port by comparing the value of (C-limit−A-rate−E-rate) with the minimum amount of memory bandwidth that must be allocated to each new active output port 112 used for transmitting Fast Ethernet data (e.g., F-factor). If F-factor is less than or equal to the difference between the maximum amount of memory bandwidth currently used by the plurality of data types (e.g., C-limit−A-rate−E-rate), a value indicating enough memory bandwidth is currently available for activating a new Fast Ethernet output port (F-avail) is set to TRUE.

More specifically, the test performed by the port activation logic 114 is F-avail=F-factor≤(C-limit−A-rate−E-rate). Alternatively, by substituting E-limit for C-limit−A-rate in the above equation and rearranging the variables, the above test performed by the port activation logic may be expressed as F-avail=E-rate≤(E-limit−F-factor).

In step 310, it is determined whether a port for transmitting data of one of the plurality of data types may be activated. Step 310 may be performed in response to a request received by the memory to transmit data of one of the plurality of data types (e.g., Fast Ethernet, Gigabit Ethernet) using a new output port. Assuming the method 300 of FIG. 3 is performed in response to a command received by the memory to transmit Gigabit Ethernet data from the network processor 102 using a new Gigabit Ethernet output port, in step 310, it is determined whether a port for transmitting Gigabit Ethernet data may be activated. The port activation logic 114 may be designed for making the determination. The port activation logic 114 may include a register (e.g., a configurable register) for storing a value indicating a maximum amount of memory bandwidth that may be used by the Gigabit Ethernet data (G-limit). Because the register may be configurable, the G-limit may be changed (e.g., by a user) based on a change in the network processor system 100 configuration. For example, if the network processor system 100 needs to receive and transmit a greater amount of Gigabit Ethernet data, a user may increase the maximum amount of memory bandwidth that may be used for receiving and transmitting such data by increasing the G-limit. The port activation logic 114 determines whether the G-rate exceeds the G-limit and whether enough memory bandwidth is currently available to activate a new Gigabit Ethernet output port (G-avail) and sets a value (G-gate) indicating whether a Gigabit Ethernet port may be started. More specifically, the test performed by the port activation logic 114 is G-gate=(G-rate>G-limit) or (not G-avail), where the value of G-gate may be TRUE or FALSE.

If either the amount of memory bandwidth used by the Gigabit Ethernet data is greater than the maximum amount of memory bandwidth that may be used by Gigabit Ethernet data (e.g., G-rate>G-limit is TRUE) or not enough memory bandwidth is currently available to activate new Gigabit Ethernet output port (e.g., not G-avail is TRUE), the value of G-gate will be TRUE. Otherwise the value of G-gate will be FALSE. It should be noted that although G-rate may be less than G-limit, enough memory bandwidth may not be currently available to activate a new Gigabit Ethernet output port, if the Fast Ethernet data is consuming a large amount of memory bandwidth.

If the value of G-gate is TRUE, an output port for transmitting Gigabit Ethernet data cannot be started, and step 312 is performed. In step 312, the activation of a new port for transmitting data of one of the plurality of data types is delayed. In this example, the activation of a new output port for transmitting Gigabit Ethernet data is delayed. Thereafter, step 310 is performed.

Alternatively, if G-gate is FALSE, an output port for transmitting Gigabit Ethernet data may be started, and step 314 is performed. In step 314, a port for transmitting data of the one of the plurality of data types is dynamically activated. Therefore, data of that data type may be transmitted from the newly activated port. In this example, a new output port for transmitting Gigabit Ethernet data is dynamically activated.

Alternatively, assuming the method 300 of FIG. 3 is performed in response to a command received by the memory to transmit Fast Ethernet data from the network processor 102 using a new Fast Ethernet output port, in step 310, it is determined whether a port for transmitting Fast Ethernet data may be activated. The port activation logic 114 may be designed for making the determination.

More specifically, the port activation logic 114 may determine the maximum amount of memory bandwidth that may be used for transmitting Fast Ethernet data (F-limit). The F-limit is the difference between the maximum amount of memory bandwidth that may be used for transmitting Ethernet data (E-limit) and the maximum amount of memory bandwidth of the network processor that may be used for transmitting Gigabit Ethernet data (G-limit). Therefore, F-limit=E-limit−G-limit.

The port activation logic 114 may be designed for determining whether memory bandwidth is currently available to transmit Gigabit Ethernet and/or Fast Ethernet data using a new Gigabit Ethernet port and/or Fast Ethernet port, respectively, by comparing the value of (C-limit−A-rate−E-rate) with G-factor, which represents the minimum amount of memory bandwidth that must be allocated to each newly active output port 112 used for transmitting Gigabit Ethernet data. If the minimum amount of memory bandwidth that must be allocated to each active output port 112 used for transmitting Gigabit Ethernet data (e.g., G-factor) is less than the difference between the maximum amount of memory bandwidth that may be used by the plurality of the data types and the total amount of the bandwidth of the network processor currently used by the plurality of data types (e.g., C-limit−A-rate−E-rate), a value indicating enough memory bandwidth is currently available to activate a new Gigabit Ethernet and/or Fast Ethernet output port (FG-avail) is set to TRUE. More specifically, the test performed by the port activation logic 114 is FG-avail=G-factor<(C-limit−A-rate−E-rate). Alternatively, by substituting E-limit for (C-limit−A-rate) and rearranging the variables, the above test performed by the port activation logic 114 may be expressed as FG-avail=E-rate<(E-limit−G-factor).

The port activation logic 114 may determine whether the F-rate is greater than the F-limit, whether enough memory bandwidth is currently available to activate a new Gigabit Ethernet and/or Fast Ethernet output port, whether enough memory bandwidth is currently available to activate a new Fast Ethernet output port, and set a value (F-gate) indicating whether a Fast Ethernet port may be started. More specifically, the test performed by the port activation logic 114 is F-gate=[(F-rate>F-limit) and (not FG-avail)] or not F-avail, where the value of F-gate may be TRUE or FALSE. If both the amount of memory bandwidth used by the Fast Ethernet data is greater than the maximum amount of memory bandwidth that may be used by Fast Ethernet data (e.g., F-rate>F-limit is TRUE) and not enough memory bandwidth is currently available for activating a new Gigabit Ethernet and/or Fast Ethernet output port (e.g., not FG-avail is TRUE), the value of F-gate will be TRUE. Otherwise the value of F-gate will be FALSE.

It should be noted that although F-rate may be less than F-limit, enough memory bandwidth may not be currently available to activate a new Fast Ethernet output port if the Gigabit Ethernet data consumes a large amount of memory bandwidth. Additionally, although F-rate may be greater than F-limit, a new Fast Ethernet output port may be activated if enough memory bandwidth is currently available to activate a new Gigabit Ethernet and Fast Ethernet output port (e.g., not FG-avail is FALSE) and enough memory bandwidth is currently available to activate a new Fast Ethernet output port (e.g., not F-avail is FALSE), because the value of F-gate will be FALSE.

If the value of F-gate is TRUE, an output port for transmitting Fast Ethernet data cannot be started, and step 312 is performed. In step 312, the activation of a new port for transmitting Fast Ethernet data is delayed, for example. Thereafter, step 310 is performed. Alternatively, if the value of F-gate is FALSE, an output port for transmitting Fast Ethernet data may be started, and step 314 is performed. In step 314, a new output port for transmitting Fast Ethernet data is dynamically activated, for example.

In step 316, the method 300 of FIG. 3 ends. Through the use of the above methods of self-adjusting the allocation of memory bandwidth in a network processor system 100, the transmission of new Gigabit Ethernet data (e.g., a new Gigabit Ethernet frame) may only be started if there is enough available memory bandwidth to ensure that transmission of the new Gigabit Ethernet frame will not cause an underrun to any of the Ethernet ports currently used for transmitting data. Likewise, the transmission of a new Fast Ethernet data (e.g., a new Fast Ethernet frame) may only be started if there is enough available memory bandwidth to ensure that transmission of the new Fast Ethernet frame will not cause an underrun to any of the Ethernet ports currently used for transmitting data. In addition, Fast Ethernet data cannot starve out Gigabit Ethernet data, and vice versa.

The operation of the network processor system 100 is now described with reference to FIG. 1, and with reference to FIG. 4, which illustrates a table of values for the variables used in the present method 300 for eight different exemplary network processor systems. For each of the eight examples, the network processor 102 includes three active Gigabit Ethernet ports, fourteen active Fast Ethernet ports, three ATM ports (two of which are active), a C-limit value of 38, a G-limit value of 17, an A-factor value of 7, and an E-limit value of 24. With reference to the equations and variables described above, in example 2, G-active=1 and F-active=5. Therefore, the G-rate is 10, the F-rate is 5 and the E-rate is 15. Using the calculated and/or provided values in each of the G-avail, F-avail and FG-avail equations, respectively, yields G-avail is FALSE, F-avail is TRUE, and FG-avail is FALSE. Using the calculated and/or provided values in each of the G-gate and F-gate equations, respectively, yields G-gate is TRUE and F-gate is FALSE. As described above, because G-gate is TRUE, and F-gate is FALSE the port activation logic 114 will not allow a new Gigabit Ethernet port to be started.

In contrast, in Example 6, G-active=0 and F-active=14. Therefore, the G-rate is 0, the F-rate is 14 and the E-rate is 14. Using the calculated and/or provided values in each of the G-avail, F-avail and FG-avail equations, respectively, yields G-avail TRUE, F-avail is TRUE and FG-avail is FALSE. Using the calculated and/or provided values in each of the G-gate and F-gate equations, respectively, yields G-gate is FALSE and F-gate is TRUE. As described above, because G-gate is FALSE and F-gate is TRUE, the port activation 114 will allow a Gigabit Ethernet port to be started, but will not allow a Fast Ethernet port to be started.

The foregoing description only discloses exemplary embodiments of the invention. Modifications of the above-disclosed embodiments of the present invention of which fall within the scope of the invention will be readily apparent to those of ordinary skill in the art. For instance, while the present methods and apparatus disclose the use of an on-chip memory, the on-chip memory may not be included in other embodiments. Therefore, the output ports, may be coupled to the memory controller 108 or memory 104. Further, while in the present methods and apparatus the A-factor, C-limit, and G-limit are stored in registers and are configurable, in other embodiments, different variables may be configurable. Further, although in one or more embodiments the F-factor was 1 and the G-factor was 10, different values may be used in other embodiments. Also, while in the present methods and apparatus the F-factor, G-factor and A-factor represent one or more 100 Mbps portions of the memory bandwidth, the F-factor, G-factor, and A-factor may represent one or more larger or smaller portions of the memory bandwidth. Further, although the present methods and apparatus disclose receiving and transmitting ATM, Fast Ethernet, and/or Gigabit Ethernet data, in other embodiments more, less and/or different types of data may be used. Dynamically adjusting the amount of memory bandwidth allocated to one of the plurality of data types may include dynamically adjusting the amount of memory bandwidth allocated to more than one of the plurality of data types. Further, determining whether memory bandwidth may be allocated to one of the plurality of data types may include determining whether memory bandwidth may be allocated to more than one of the plurality of data types.

Accordingly, while the present invention has been disclosed in connection with exemplary embodiments thereof, it should be understood that other embodiments may fall within the spirit and scope of the invention as defined by the following claims.

The invention claimed is:

1. A method of self-adjusting allocation of memory bandwidth in a network processor system comprising:
   determining an amount of memory bandwidth of a network processor used by a plurality of data types to transmit data through a plurality of active ports;
   determining an amount of memory bandwidth of the network processor used by each of the plurality of data types; and
   dynamically adjusting an amount of memory bandwidth allocated to at least one of the plurality of data types based on the determinations.

2. The method of claim 1 wherein a total amount of memory bandwidth of the network processor used by the plurality of data types is configurable.

3. The method of claim 2 further comprising determining whether memory bandwidth may be allocated to at least one of the plurality of data types.

4. The method of claim 3 wherein determining whether memory bandwidth may be allocated to at least one of the plurality of data types includes determining a difference between a maximum amount of memory bandwidth of the network processor that may be used by the plurality of data types and a total amount of memory bandwidth of the network processor currently used by the plurality of data types.

5. The method of claim 3 wherein determining whether memory bandwidth may be allocated to at least one of the plurality of data types includes determining whether a port for transmitting data of at least one of the plurality data types may be activated.

6. The method of claim 1 wherein determining an amount of memory bandwidth of the network processor used by each of a plurality of data types includes:
   determining a number of active ports of the network processor used to transmit data of each of the plurality of data types; and
   determining an amount of memory bandwidth allocated to each active port for each of the plurality of data types.

7. The method of claim 6 wherein the amount of memory bandwidth allocated to each active port for a data type is the same.

8. The method of claim 6 wherein the amount of memory bandwidth allocated to each active port for an ATM protocol data type is configurable.

9. The method of claim 1 wherein the plurality of data types includes at least one of an ATM protocol data type and an Ethernet protocol data type.

10. The method of claim 9 wherein the Ethernet protocol data type includes at least one of a Gigabit Ethernet data type and a Fast Ethernet data type.

11. The method of claim 1 wherein dynamically adjusting the amount of memory bandwidth allocated to at least one of the plurality of data types based on the determinations includes at least one of dynamically activating and deactivating a port for transmitting data of at least one of the plurality of data types.

12. An apparatus comprising:
   port activation logic, adapted to couple to a memory of a network processor and to interact with the memory so as to:
      determine an amount of memory bandwidth of the network processor used by a plurality of data types to transmit data through a plurality of active ports;
      determine an amount of memory bandwidth of the network processor used by each of the plurality of data types; and
      dynamically adjust an amount of memory bandwidth allocated to at least one of the plurality of data types based on the determinations.

13. The apparatus of claim 12 wherein a total amount of memory bandwidth of the network processor used by the plurality of data types is configurable.

14. The apparatus of claim 13 wherein the port activation logic is further adapted to determine whether memory bandwidth may be allocated to at least one of the plurality of data types.

15. The apparatus of claim 14 wherein the port activation logic is further adapted to determine a difference between a maximum amount of memory bandwidth of the network processor that may be used by the plurality of data types and a total amount of memory bandwidth of the network processor currently used by the plurality of data types.

16. The apparatus of claim 14 wherein the port activation logic is further adapted to determine whether a port for transmitting data of at least one of the plurality data types may be activated.

17. The apparatus of claim 12 wherein the port activation logic is further adapted to:
   determine a number of active ports of the network processor used to transmit data of each of the plurality of data types; and
   determine an amount of memory bandwidth allocated to each active port for each of the plurality of data types.

18. The apparatus of claim 17 wherein the amount of memory bandwidth allocated to each active port for a data type is the same.

19. The apparatus of claim 17 wherein the amount of memory bandwidth allocated to each active port for an ATM protocol data type is configurable.

20. The apparatus of claim 12 wherein the plurality of data types includes at least one of an ATM protocol data type and an Ethernet protocol data type.

21. The apparatus of claim 20 wherein the Ethernet protocol data type includes at least one of a Gigabit Ethernet data type and a Fast Ethernet data type.

22. The apparatus of claim 12 wherein the port activation logic is further adapted to at least one of dynamically activate and deactivate a port for transmitting data of at least one of the plurality of data types.

23. A network processor system comprising:
   a memory; and
   a network processor coupled to the memory, the network processor comprising:
      a memory controller;
      a plurality of ports; and
      port activation logic, coupled to the memory controller, the plurality of ports and the memory, and adapted to interact with the memory so as to:
         determine an amount of memory bandwidth of the network processor used by a plurality of data types to transmit data through a plurality of active ports;
         determine an amount of memory bandwidth of the network processor used by each of the plurality of data types; and
         dynamically adjust an amount of memory bandwidth allocated to at least one of the plurality of data types based on the determinations.

* * * * *